United States Patent
Leis (10) Patent No.: US 7,992,029 B2
(45) Date of Patent: Aug. 2, 2011

(54) ELECTRONIC DEVICE WITH TEMPORARY FLAG FOR FAIL SAFE AND POWER CYCLING

(75) Inventor: Michael Leis, Framingham, MA (US)

(73) Assignee: Seagate Technology LLC, Cupertino, CA (US)

( * ) Notice: Subject to any disclaimer, the term of this patent is extended or adjusted under 35 U.S.C. 154(b) by 1233 days.

(21) Appl. No.: 11/654,113

(22) Filed: Jan. 17, 2007

(65) Prior Publication Data
US 2007/0208957 A1    Sep. 6, 2007

Related U.S. Application Data

(60) Provisional application No. 60/779,286, filed on Mar. 3, 2006.

(51) Int. Cl.
*G06F 1/26* (2006.01)
(52) U.S. Cl. .............. 713/340; 327/143; 714/22
(58) Field of Classification Search ............ 327/143; 713/340; 714/22
See application file for complete search history.

(56) References Cited

U.S. PATENT DOCUMENTS

| | | | | |
|---|---|---|---|---|
| 4,245,150 | A | * | 1/1981 | Driscoll et al. ............ 377/32 |
| 5,543,741 | A | * | 8/1996 | Purits ..................... 327/143 |
| 6,959,399 | B2 | | 10/2005 | King et al. |
| 7,116,139 | B2 | * | 10/2006 | Mitchell ................ 327/142 |
| 2004/0059905 | A1 | * | 3/2004 | Soulier .................... 713/2 |

* cited by examiner

*Primary Examiner* — Albert Wang
(74) *Attorney, Agent, or Firm* — David K. Lucente (57) ABSTRACT

An electronic device includes a flag circuit configured to generate a status flag indicating whether or not a power supply voltage to the electronic device has been cycled, and a controller configured to control an operation of the electronic device and to modify an operational characteristic of the electronic device in response to the status flag indicating that the power supply voltage to the electronic device has been cycled. Methods of operating an electronic device include generating a status flag indicating whether or not a power supply voltage to the electronic device has been cycled within about a defined time, and modifying an operational characteristic of the electronic device in response to the status flag indicating that the power supply voltage to the electronic device has been cycled within about the defined time.

22 Claims, 5 Drawing Sheets

ELECTRONIC DEVICE WITH TEMPORARY FLAG FOR FAIL SAFE AND POWER CYCLING

RELATED APPLICATION

This application claims the benefit of and priority to U.S. Provisional Patent Application No. 60/779,286 entitled "Temporary Flag for Fail Safe and Power Cycling," filed Mar. 3, 2006, the disclosure of which is hereby incorporated herein by reference as if set forth in its entirety.

FIELD OF THE INVENTION

The present invention generally relates to digital data storage devices and, more particularly, to apparatus for maintaining a status flag and monitoring a power supply in a disk drive and to disk drives including apparatus for monitoring the power supply thereof.

BACKGROUND

Disk drives are digital data storage devices that can store and retrieve large amounts of data in a fast and efficient manner. A typical disk drive includes a plurality of magnetic recording disks that are mounted to a rotatable hub of a spindle motor and rotated at a high speed. An array of read/write heads is disposed adjacent to surfaces of the disks to transfer data between the disks and a host computer. The transducers can be radially positioned over the disks by a rotary actuator and a closed loop digital servo system, and can fly proximate the surfaces of the disks upon air bearings.

A plurality of nominally concentric tracks can be defined on each disk surface. A preamp and driver circuit generates write currents that are used by the transducer to selectively magnetize the tracks during a data write operation and amplifies read signals detected by the transducer from the selective magnetization of the tracks during a data read operation. A read/write channel and interface circuit are connected to the preamp and driver circuit to transfer the data between the disks and the host computer.

A disk drive requires a voltage supply to operate. Typically, the voltage supply is provided by a host computer or storage rack in which the disk drive is mounted. A typical voltage supply provided by a host computer for a disk drive is a DC supply voltage providing +5 volts of DC power and sometimes +12 volts of DC power. In general, the voltage supply to the disk drive is turned on when the host computer is powered up, and turned off when the host computer is powered down. Powering up and down of a host computer is typically a controlled event in which a shutdown request is provided to the CPU of the host computer. The host computer is then allowed to shut down the system in an orderly fashion. For example, buffers may be processed and/or queues may be cleared to ensure that no data is lost during the shutdown. With respect to a disk drive, after all outstanding data reads and writes have been processed, the host computer may turn off the supply voltage to the disk drive.

From time to time, however, the supply voltage to the disk drive may be interrupted unexpectedly. For example, a user may manually unplug or switch off the host computer, or a system controller may cause the power to be turned off and then on. after detecting high power consumption of the disk drive. In some cases, a user may manually turn off and restart a computer if the disk drive fails to operate as expected. Turning a host computer off and back on may cause the power supply to the disk drive to be interrupted and restarted within a short period of time. Such interrupting and restarting of the power supply to the disk drive within a short period of time may be referred to as "cycling" or "recycling" the power supply. For example, if the disk drive fails to spin up to speed when the computer is booted, or the drive may fail to otherwise start properly, the user or system may cycle the power off and back on in an attempt to cause the disk drive to recover. In that case, however, the disk drive may follow the same start-up procedures that failed in the first place, which may lead to repeated failures.

While information about the state of a disk drive may be stored in nonvolatile memories, such memories may be expensive. Moreover, the additional circuitry and programming required to store state information in a nonvolatile memory may increase the complexity and/or cost of the disk drive. Furthermore, an internal fault may have occurred that would make it difficult to write a nonvolatile memory.

SUMMARY

An electronic device according to some embodiments of the invention includes a flag circuit configured to generate a status flag indicating whether or not a power supply voltage to the electronic device has been cycled within about a defined time, and a controller configured to control the operation of the electronic device and to modify an operational characteristic of the electronic device in response to the status flag indicating that the power supply voltage to the electronic device has been cycled within about the defined time.

The flag circuit may include a capacitor, and the status flag may be representative of a voltage on the capacitor and the defined time may be at least partially defined by a capacitance of the capacitor. The capacitor may be coupled to the power supply voltage through a first resistor.

The electronic device may further include a comparator including an input terminal and an output terminal and configured to compare an input voltage at the input terminal with a reference voltage. The capacitor may be further coupled to the input terminal of the comparator.

The comparator may be further configured to output a first logic level if the input voltage at the input terminal exceeds the reference voltage and to output a second logic level if the input voltage at the input terminal is less than the reference voltage.

The electronic device may further include a rectifier between the first resistor and the capacitor. The rectifier may be configured to block a flow of current from the capacitor to the first resistor.

The electronic device may further include a bleed resistor in parallel with the capacitor and having a resistance typically greater than a resistance of the first resistor. The defined time may be at least partially defined by the resistance of the bleed resistor.

The electronic device may further include a set/reset circuit-coupled to the capacitor. The set/reset circuit may be configured to set the voltage on the capacitor to the power supply voltage upon receipt of a SET FLAG command, and to reset the voltage on the capacitor to zero upon receipt of a RESET FLAG command.

The electronic device may further include a voltage divider having an output terminal and configured to generate the reference voltage from the power supply voltage. The output terminal of the voltage divider may be connected to the comparator.

The electronic device may include a disk drive including a data storage disk, and the controller may be configured to reduce an angular acceleration of the data storage disk during startup in response to the status flag indicating that the power supply voltage to the electronic device has been recently cycled.

The controller may be configured to alter an operational threshold or parameter of the data storage disk in response to the status flag indicating that the power supply voltage to the electronic device has been cycled. The operational threshold or parameter may include a temperature threshold, a position error threshold, a modified seek torque, a spin start delay, and/or a bit error rate threshold.

The controller may be further configured to return the altered operational characteristic of the electronic device to a previous value after the occurrence of a predetermined condition, such as the passage of a predetermined time period following the status flag indicating that the power supply voltage to the electronic device has been cycled and/or the occurrence of a electronic device start up without the status flag indicating that the power supply has been cycled.

The controller may be further configured to initiate a fault recovery routine or other diagnostic routines in response to the status flag indicating that the power supply voltage to the electronic device has been cycled.

A circuit according to some embodiments of the invention is configured to generate a status flag indicating whether or not a power supply voltage to an electronic device has been recently cycled. The circuit includes a first resistor and a capacitor coupled to the power supply voltage through the first resistor. The status flag may be representative of a voltage on the capacitor.

The circuit may further include a comparator including an input terminal and an output terminal and configured to compare an input voltage at the input terminal with a reference voltage. The capacitor may be coupled to the input terminal of the comparator.

The comparator may be further configured to output a first logic level if the input voltage at the input terminal exceeds the reference voltage and to output a second logic level if the input voltage at the input terminal is less than the reference voltage.

The circuit may further include a rectifier between the first resistor and the capacitor. The rectifier may be configured to block a flow of current from the capacitor to the first resistor.

The circuit may further include a bleed resistor in parallel with the capacitor and having a resistance greater than a resistance of the first resistor.

The circuit may further include a set/reset circuit coupled to the capacitor. The set/reset circuit may be configured to set the voltage on the capacitor to the power supply voltage upon receipt of a SET FLAG command, and to reset the voltage on the capacitor to zero upon receipt of a RESET FLAG command.

The circuit may further include a voltage divider having an output terminal and configured to generate the reference voltage from the power supply voltage. The output terminal of the voltage divider may be connected to the comparator.

Some embodiments of the invention provide methods of operating an electronic device. The methods include generating a status flag indicating whether or not a power supply voltage to the electronic device has been cycled within about a defined time, and modifying an operational characteristic of the electronic device in response to the status flag indicating that the power supply voltage to the electronic device has been cycled within about the defined time.

Generating the status flag may include comparing a voltage across a capacitor to a reference voltage. The methods may further include charging the capacitor from the power supply voltage using an RC circuit when the power supply voltage is switched on. The methods may further include discharging the capacitor when the power supply voltage is switched off.

A charge rate of the capacitor through the RC circuit may be faster than a discharge rate of the capacitor. Discharging the capacitor may include discharging the capacitor through a bleed resistor having a higher resistance than the resistance of the RC circuit used in charging the capacitor.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein the term "and/or" includes any and all combinations of one or more of the associated listed items. Similarly, a list of items separated by the symbol "/" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention may be embodied as apparatus, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. The term "signal" may take the form of a continuous waveform and/or discrete value(s), such as digital value(s) in a memory or register.

The present invention is described below with reference to block diagrams and/or operational illustrations of apparatus, methods, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
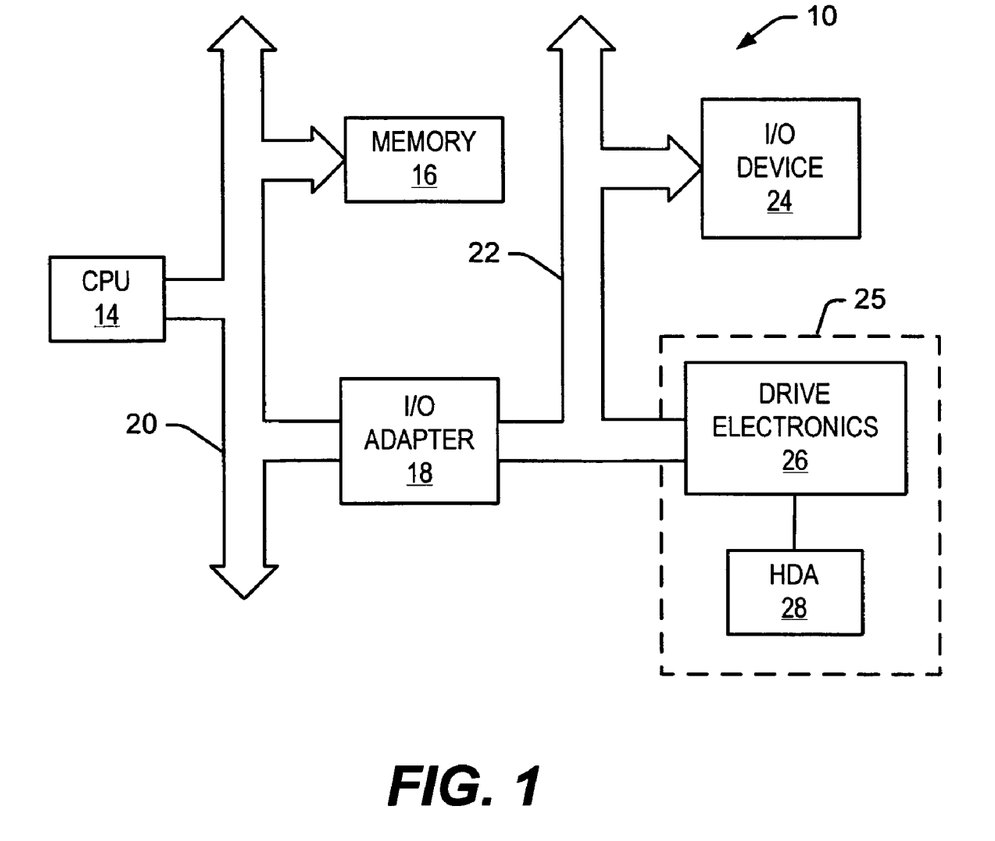
FIG. 1 is a block diagram of an exemplary computer system that includes a disk drive.

Referring to FIG. 1, an exemplary computer system 10 is shown that includes a central processing unit ("CPU") 14, a main memory 16, and I/O bus adapter 18, all interconnected by a system bus 20. Coupled to the I/O bus adapter 18 is I/O bus 22, that may be, for example, a small computer system interconnect (SCSI) bus, firewire bus, and/or a universal serial bus. The I/O bus 22 supports various peripheral devices 24 and a data storage unit such as a disk drive 25. The disk drive 25 includes drive electronics 26 and a head disk assembly 28 ("HDA").

Figure 2:
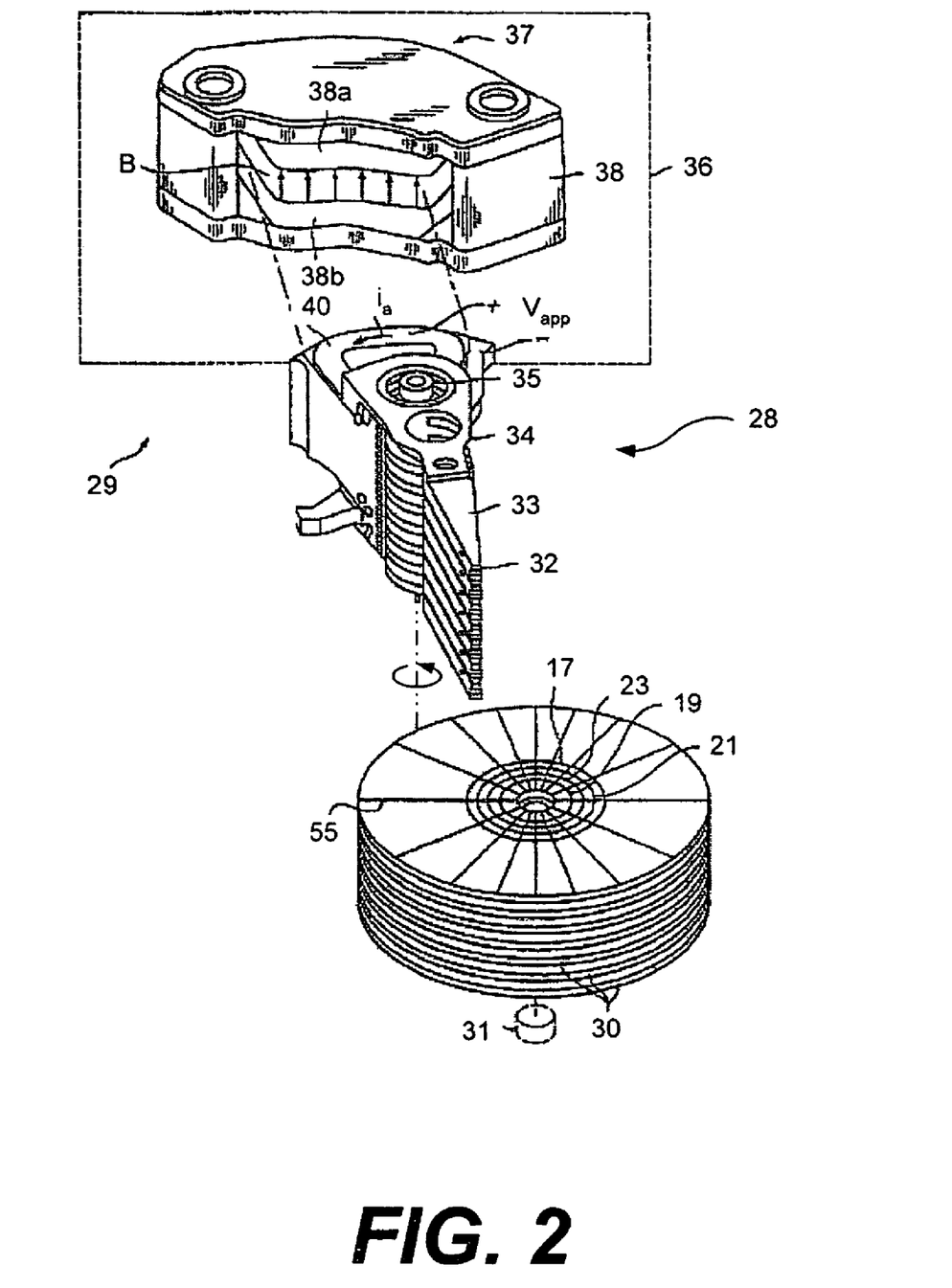
FIG. 2 is a diagram of an exemplary head disk assembly of the disk drive.

Referring to FIG. 2, an exemplary embodiment of the HDA 28 of FIG. 1 is shown that includes an actuator 29 and disks 30 that can be rotated by a spindle motor 31. Data can be stored on the disks 30 in concentric circular data tracks 17. The data can be written and read from the disks 30 via magnetic transducers 32 which are attached to flexible load beams 33 extending from actuator arms 34. The actuator arms 34 pivot about point 35 to move the load beams 33 in a radial direction over the storage surfaces of the disks 30 from an initial track 19 towards a target track 21 shown in FIG. 2 by example. At the target track 21, the magnetic transducers 32 can read from and/or write data on the disks 30. A motor 36 controls the radial movement of the actuator arms 34 in response to an input actuator current $i_a$. Although the disks 30 are described as magnetic disks for purposes of illustration, the disks 30 may alternatively be optical disks or any other type of storage disk which can have data storage tracks defined on one or both of its storage surfaces.

The exemplary motor 36 can include a magnet 37 containing two plates 38a, 38b coupled together via a pair of sidewalls to form a flat toroidal shaped member 38. A wire coil 40 attached to the actuator arms 34 is disposed between the two plates 38a and 38b. The magnet 37 may generate a constant magnetic field B between the plates 38a and 38b. When the input actuator current $i_a$ is passed through the coil 40 disposed in the magnetic field B, a torque is produced on the actuator arms 34 resulting in radial motion of the arms 34 about a pivot point 35. The polarity of the input actuator current $i_a$ determines the direction of the force applied to the actuator arms 34.

Figure 3:
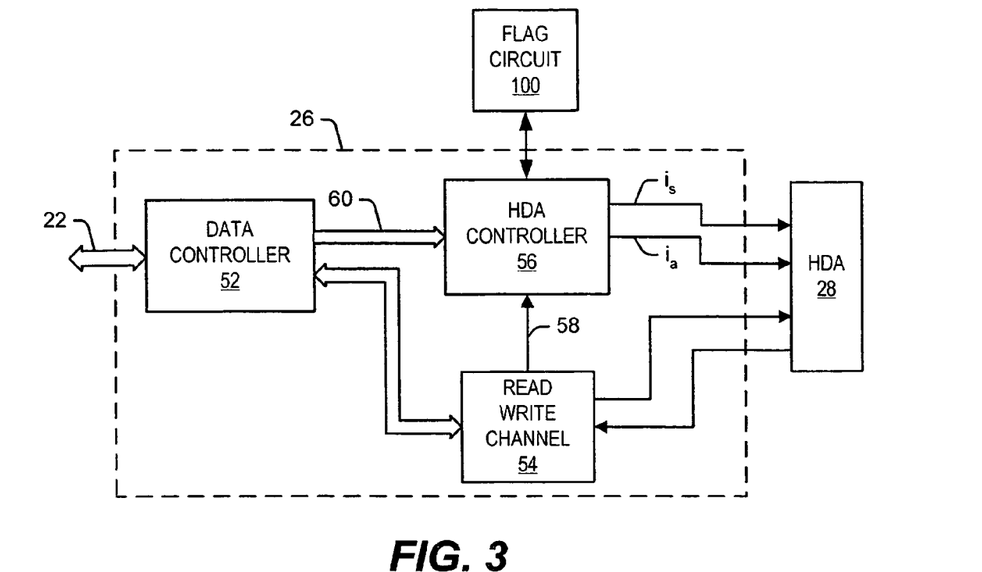
FIG. 3 is a block diagram of the drive electronics of the disk drive that is configured according to some embodiments of the present invention.

Referring to FIG. 3, the drive electronics 26 (FIG. 1) includes a data controller 52, a read/write channel 54, and an HDA controller 56. The HDA controller 56 functions as both as a servo controller to provide feedback control of the motion of the actuator arms 34 as well as a spin controller to control the spin-up (i.e. acceleration), spin rate and spin-down (i.e. deceleration) of the disks 30 by the spindle motor 31. A data transfer initiated by the CPU 14 to the disk drive 25 may involve, for example, a DMA transfer of data from the memory 16 onto the system bus 20 (FIG. 1). Data from the system bus 20 are transferred by the I/O adapter 18 onto the I/O bus 22. The data are read from the I/O bus 22 by the data controller 52, which formats the data into blocks with the appropriate header information and transfers the digital data to the read/write channel 54.

The read/write channel 54 can operate in a conventional manner to convert data between the digital form used by the data controller 52 and the analog form used by the transducers 32. For the transfer from the CPU 14 to the HDA 28, the read/write channel 54 converts the data to an analog form suitable for writing by a transducer 32 to the HDA 28. The read/write channel 54 also provides servo positional information read from the HDA 28 to the HDA controller 56 on lines 58. For example, the concentric data tracks 17 on the storage surface of a data disk 30 can be broken up and divided into segments by a multiplicity of regularly spaced apart embedded servo sectors 55 (FIG. 2). Each servo sector 55 can include transducer location information such as a track identification field and data block address, for identifying the track and data block, and burst fields to provide servo fine location information. The transducer location information can be used to detect the location of the transducer 32 in relation to that track and data block within the track. The transducer location information is induced into the transducer 32, converted from analog signals to digital data in the read/write channel 54, and transferred to the HDA controller 56. The HDA controller 56 can use the transducer location information for performing seek and tracking operations of the transducer 32 over the disk tracks 17.

The data controller 52 also provides data that identifies the target track location and the addressed data block on lines 60 to the HDA controller 56. The HDA controller 56 generates a current command, which is a voltage signal that is converted into the input actuator current $i_a$, and provided to the actuator 29 to move the transducer 32 radially across the disk 30.

When the disk drive 25 is activated, for example after a restart of the host system 10 or after an instruction from the host CPU 14 for the disk drive 25 to awaken from a sleep mode, the HDA controller 56 may generate a spin command $i_s$ that is sent to the spindle motor 31 and that causes the spindle motor 31 to spin the disks 30 up at a desired rate of angular acceleration to a desired rotational speed.

According to some embodiments of the invention, the HDA controller 56 may check the status of a flag set by a flag circuit 100 prior to causing the spindle motor 31 to spin the disks 30 up to the target rotational speed. Based on the status of the flag, the HDA controller 56 may cause the spindle motor 31 to spin the disks 30 up to speed in either a standard mode or, alternatively, a fault recovery mode. In fault recovery mode, the HDA controller 56 may, for example, cause the spindle motor 31 to limit the angular acceleration used to spin the disks 30 up to speed, thereby reducing the power consumption. Other actions may be taken by the HDA controller 56 in response to an indication that a fault has occurred. For example, the HDA controller 56 may limit the magnitude of the current command $i_a$ in order to limit the amount of heat generated by the HDA during seek operations. The HDA controller 56 may adjust other aspects of the operation of the disk drive 25 in response to a flag indicating that a fault has occurred. For example, it may delay the start of spinup, or various thresholds, such as operating temperature thresholds, position error thresholds, bit error rate thresholds, etc., may be adjusted to provide a more conservative operating environment for the disk drive in an attempt to ensure that the cause of the previous fault does not occur repeatedly. Similarly, the HDA controller 56 may execute a special startup routine and/or a diagnostic routine in response to a flag indicating that a fault has occurred.

Figure 4:
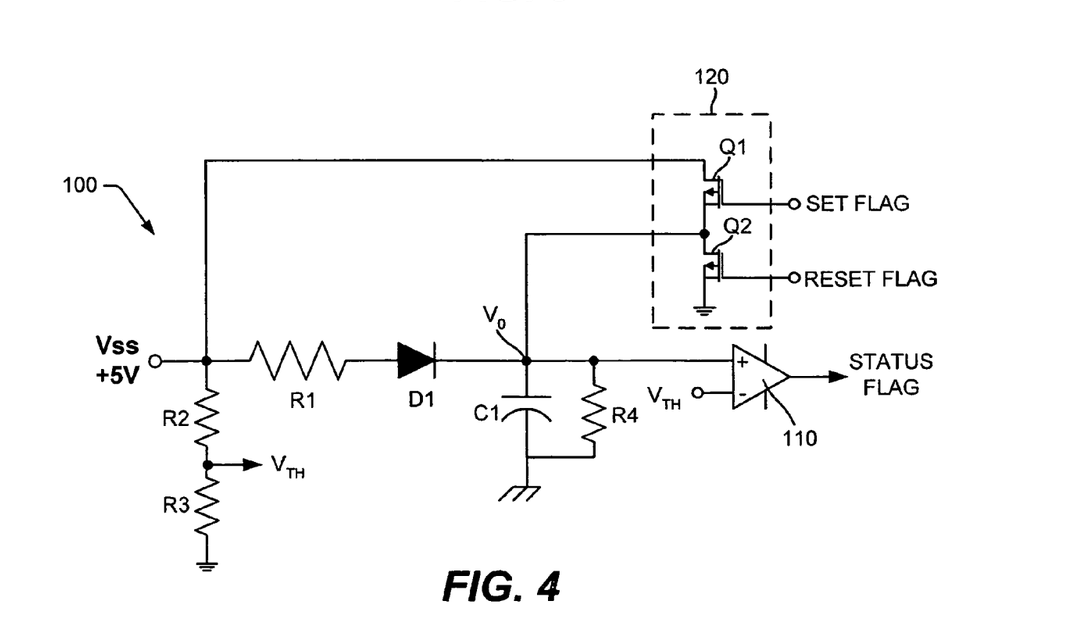
FIG. 4 is a diagram of a flag circuit according to some embodiments of the invention.

A flag circuit 100 that resides in the disk drive 25 and that is configured according to some embodiments of the invention is illustrated in FIG. 4. The flag circuit 100 includes an RC circuit including a first resistor R1 and a capacitor C1. A rectifier D1 is coupled between the first resistor R1 and the capacitor C1. The rectifier D1, which may be implemented as a diode, permits current flow in only one direction, namely, from the first resistor R1 into the capacitor C1. Current flow from the capacitor C1 back to the first resistor R1 is blocked by the rectifier D1.

The RC circuit may have a moderate charge-up rate and a relatively slow charge-down rate, such that a voltage across the capacitor C1 (i.e. the voltage at node $V_0$) increases at a moderate rate when the supply voltage $V_{SS}$ is applied to the flag circuit 100. When the supply voltage $V_{SS}$ is interrupted for any reason, the voltage across the capacitor will decrease relatively slowly, since current cannot flow back through the rectifier D1 to be dissipated in the first resistor R1.

An optional bleed resistor R4 may be coupled in parallel with the capacitor C1. The bleed resistor R4 may have a resistance that is greater than the resistance of the first resistor R1, so that the charge-down rate of the capacitor C1 is slower than its charge-up rate. That is, the RC time constant of the circuit including the first resistor R1 and the capacitor C1 may be smaller than the RC time constant of the circuit including the capacitor C1 and the bleed resistor R4. If the optional bleed resistor R4 is omitted, discharge of the capacitor C1 may be limited to leakage current, which may be very small.

In particular embodiments, the first resistor R1 may have a resistance of about 5 MΩ and the capacitor C1 may have a capacitance of about 0.06 μF, which results in an RC time constant of 300 ms for the charge-up circuit. The bleed resistor R4 may have a resistance selected to provide a desired charge-down time, and, in particular, may have a resistance that is greater than the resistance of the first resistor R1. In embodiments in which the bleed resistor R4 is included, if the bleed current is $\frac{1}{10}^{th}$ of the charge current and the threshold voltage $V_{TH}$ is 1 Volt, the output of the flag circuit 100 may have a memory time of about 12 seconds. Different values of $V_{SS}$, $V_{th}$ and different ratios of R1 to R4 will allow design flexibility in setting delay times. It is also understood that R1 and R4 may be implemented as active circuits, such as semiconductor current sources.

The flag circuit 100 further includes a comparator 110 configured to compare the value of the voltage at node $V_0$ (i.e. the voltage on the capacitor C1) with a reference threshold voltage $V_{TH}$. The reference threshold voltage $V_{TH}$ may be generated by a voltage divider circuit including second and third resistors R2 and R3 connected in series to the supply voltage $V_{SS}$, as shown in FIG. 4. The comparator 110 may be implemented using, for example, an operational amplifier. However, other comparator circuits may be used. If the voltage at node $V_0$ is greater than the threshold voltage $V_{TH}$, the comparator 110 will output a logic '1' as the STATUS FLAG output. The comparator 110 will output a logic '0' as the STATUS FLAG output if the voltage at node $V_0$ is less than the threshold voltage $V_{TH}$. It will be appreciated that the logic values '0' and '1' are arbitrary, and that the output voltage of the flag circuit 100 could be inverted if desired.

The flag circuit 100 may optionally include a set/rest circuit 120 by which the voltage at node $V_0$ may be forced to a high or low level, thereby setting or resetting the STATUS FLAG output to a logic '1' or a logic '0', as desired. As shown in FIG. 4, the set/reset circuit 120 may include a first transistor Q1 having a drain connected to the supply voltage $V_{SS}$ and a source connected to the node $V_0$. A second transistor Q2 includes a drain connected to the node $V_0$ and a source connected to ground. The gate of the first transistor Q1 provides a SET FLAG input for the flag circuit 100, and the gate of the second transistor Q2 provides a RESET FLAG input for the flag circuit 100. When a voltage is applied to the SET FLAG input, the supply voltage $V_{SS}$ is applied directly to the node $V_0$, which quickly charges the capacitor C1 to the supply voltage level, resulting in the STATUS FLAG output being set to logic '1'. When a voltage is applied to the RESET FLAG input, the node $V_0$ is coupled to ground, which quickly discharges the capacitor C1, resulting in the STATUS FLAG output being reset to logic '0.' The SET FLAG input and the RESET FLAG input of the set/rest circuit 120 may be controlled, for example, by the HDA controller 56.

Accordingly, using the SET FLAG and RESET FLAG inputs to the flag circuit 100, the HDA controller 56 may directly control the state of the STATUS FLAG output by the flag circuit 100. The STATUS FLAG may be reset by the HDA controller 56, for example, if the HDA controller 56 detects that no errors were encountered in the start-up of the disk drive. Similarly, the STATUS FLAG may be set directly by the HDA controller 56 to trigger failure mode handling by the HDA controller 56 if the next power-down/power-up cycle occurs quickly.

The comparator 110 and the set/reset circuit 120 may be implemented in an application specific integrated circuit (ASIC). If the set/reset circuit 120 proves unable to drive a high impedance load on the capacitor C1 when the ASIC is powered off, an external field effect transistor (FET) may be added to buffer the capacitor.

Operation of the flag circuit 100 is illustrated in connection with FIGS. 5A-5D, which are hypothetical graphs of supply voltage ($V_{SS}$), along with corresponding graphs of the voltage on the capacitor C1 at node $V_0$, and the STATUS FLAG output by the flag circuit 100. The graphs of FIGS. 5A-5D are provided for purposes of explanation as representative illustrations of certain aspects of the operation of a flag circuit 100 according to some embodiments of the invention, but do not represent actual measured data.

Figure 5A:
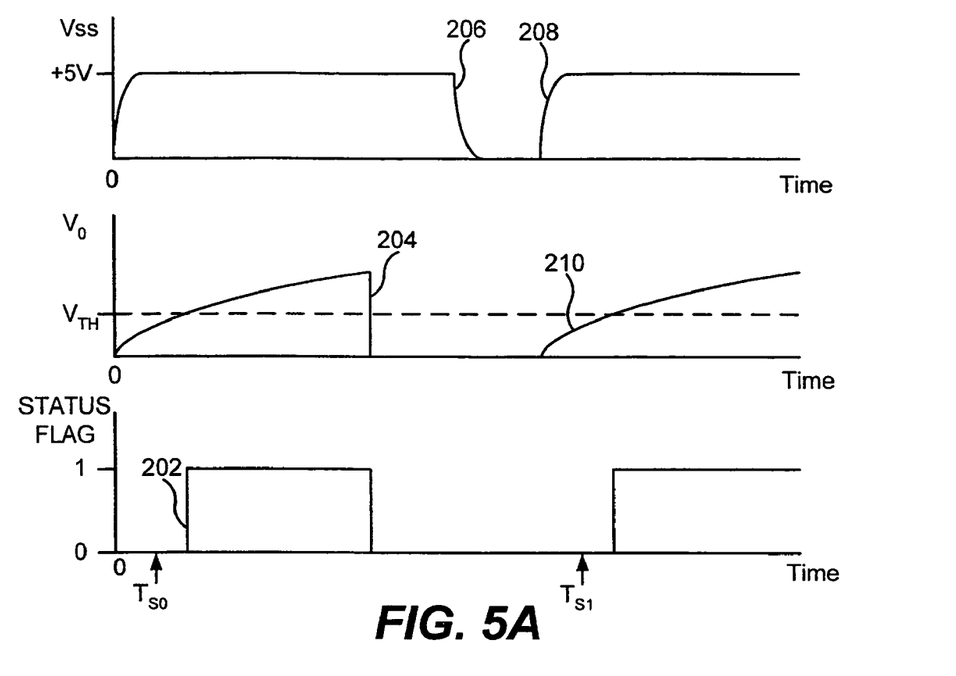
FIGS. 5A-D are graphs of supply voltage and flag levels for a system configured according to some embodiments of the invention.

For example, in the graph of FIG. 5A, the STATUS FLAG initially has a value of logic '0' at time zero when the supply voltage $V_{SS}$ is switched on. When the supply voltage $V_{SS}$ is switched on, the voltage on the capacitor C1 at node V0 begins to slowly increase according to the RC time constant defined by the first resistor R1 and the capacitor C1. When the level of the voltage on the capacitor C1 (i.e. the voltage at node $V_0$) exceeds the threshold reference voltage $V_{TH}$, the STATUS FLAG transitions to logic '1', as illustrated by rising edge 202 of the STATUS FLAG curve of FIG. 5A.

After the supply voltage $V_{SS}$ has reached its operational level (e.g. about +5V), the HDA controller 56 may check the level of the STATUS FLAG to determine if a fault condition exists. The initial check of the STATUS FLAG is performed at time $T_{S0}$. At that time, due to the moderately large RC time constant of the charging circuit of the flag circuit 100 including the first resistor R1 and the capacitor C1, the voltage on the capacitor C1 at node $V_0$ has not yet exceeded the threshold reference voltage $V_{TH}$. Thus, when the STATUS FLAG is checked at time $T_{S0}$, the STATUS FLAG is still at logic '0', indicating that there is no fault condition (i.e. a STATUS FLAG of '0' indicates an "OK" or "good" condition).

The HDA controller 56 may then reset the STATUS FLAG to logic '0' by raising the SET FLAG input to the flag circuit 100, which forces the voltage at node $V_0$ to zero, as indicated by the falling edge 204 of the voltage at $V_0$. The STATUS FLAG responds by switching to logic '0'.

Next, as shown by the falling edge 206 of the $V_{SS}$ signal followed by the rising edge 208, the supply voltage to the disk drive 25 is cycled (i.e. turned off and then back on). When the supply voltage $V_{SS}$ is switched back on (indicated by the rising edge 208), the voltage on the capacitor C1 at node $V_0$ begins to slowly increase according to the RC time constant defined by the first resistor R1 and the capacitor C1, as indicated by the rising edge 210 of the voltage at node $V_0$. At time $T_{S1}$ after the supply voltage $V_{SS}$ has reached its operational level (e.g. about +5V), the HDA controller 56 may check the level of the STATUS FLAG to determine if a fault condition exists. However, due to the moderately large RC time constant of the charging circuit of the flag circuit 100 including the first resistor R1 and the capacitor C1, and the fact that the HDA controller 56 has reset the STATUS FLAG to logic '0', the voltage on the capacitor C1 at node $V_0$ has not yet exceeded the threshold reference voltage $V_{TH}$ at time $T_{S1}$. Thus, when the STATUS FLAG is checked at time $T_{S1}$, the STATUS FLAG is still at logic '0'.

Figure 5B:
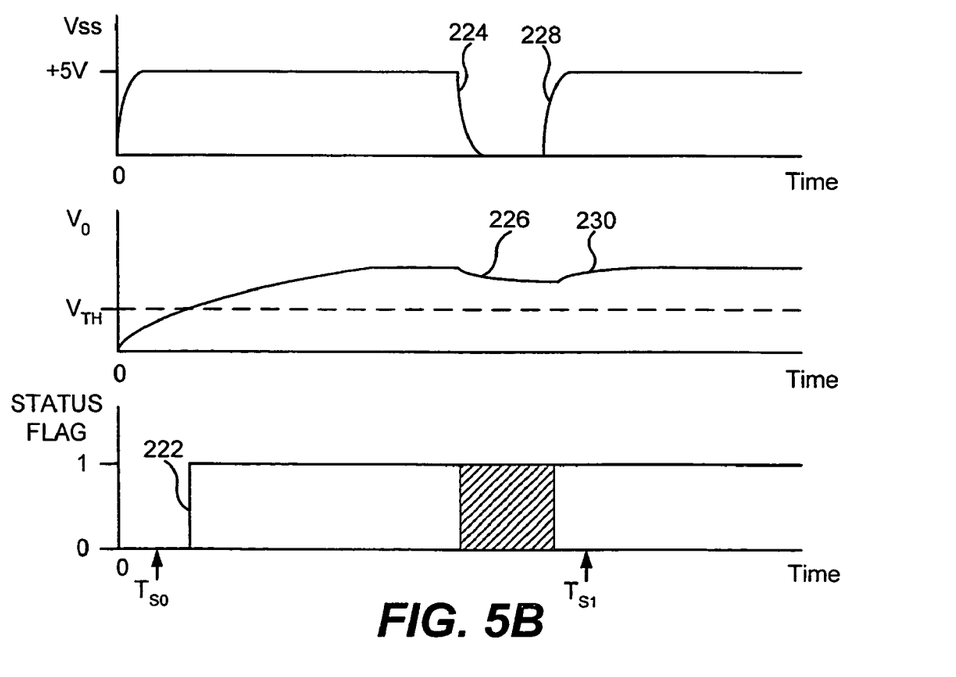

FIG. 5B illustrates a second possible sequence of events. As in FIG. 5A, the sequence illustrated in FIG. 5B begins with the supply voltage $V_{SS}$ off and the STATUS FLAG at logic '0'. The supply voltage $V_{SS}$ is switched on at time zero and increases to the operational voltage level of +5V. After the supply voltage $V_{SS}$ has reached its operational level, the HDA controller 56 may check the level of the STATUS FLAG to determine if a fault condition exists. The initial check of the STATUS FLAG is performed at time $T_{S0}$. At that time, due to the moderately large RC time constant of the charging circuit of the flag circuit 100 including the first resistor R1 and the capacitor C1, the voltage on the capacitor C1 at node $V_0$ has not yet exceeded the threshold reference voltage $V_{TH}$. Thus, when the STATUS FLAG is checked at time $T_{S0}$, the STATUS FLAG is still at logic '0', indicating that there is no fault condition. Once the voltage at node $V_0$ exceeds the threshold reference voltage $V_{TH}$, the STATUS FLAG is set to logic '1', as indicated by the rising edge 222 of the STATUS FLAG curve.

However, if the HDA controller 56 has not previously reset the STATUS FLAG to logic '0', and the supply voltage $V_{SS}$ cycles off and on, as indicated by the falling edge 224 followed by the rising edge 228 of the supply voltage signal, the STATUS FLAG may indicate a fault. When the supply voltage $V_{SS}$ is turned off, the voltage at node $V_0$ starts to slowly drop as indicated by the slowly falling edge 226 of the voltage at node $V_0$. As discussed above, the rate at which the voltage at node $V_0$ drops may depend on the amount of leakage current through the capacitor C1 and/or the discharge rate of the capacitor C1 through the optional bleed resistor R4. When the supply voltage $V_{SS}$ is cycled back on, as indicated by the rising edge 228 of the supply voltage $V_{SS}$, the voltage at node $V_0$ again begins to rise, as indicated by the slowly rising edge 230 of the voltage at node $V_0$. In this case, since the voltage $V_0$ has not dropped below $V_{th}$, when the HDA controller 56 checks the state of the STATUS FLAG at time $T_{S1}$, the STATUS FLAG has a value of logic '1', indicating that a recent cycling of the supply voltage $V_{SS}$ has occurred without having $V_0$ reset to zero. In response, the HDA controller 56 may modify one or more start-up and/or operational characteristics of the disk drive 25 in an effort to alleviate the conditions that may have precipitated the power cycling. For example, as discussed above, the HDA controller 56 may execute a more conservative spin-up of the disks 30, may alter one or more operational thresholds associated with disk operation, such as temperature thresholds, position error thresholds, bit error rate thresholds, etc., and/or may alter other aspects of the disk operation. Such alterations may be temporary. For example, the HDA controller 56 may return to previous operating characteristics after a predetermined period of time and/or after the next time the disk drive starts up without a fault indication from the STATUS FLAG. It will be appreciated that the STATUS FLAG is not used, or is indeterminate, when the power is off, between edges 224 and 228, as indicated by cross-hatching.

Figure 5C:
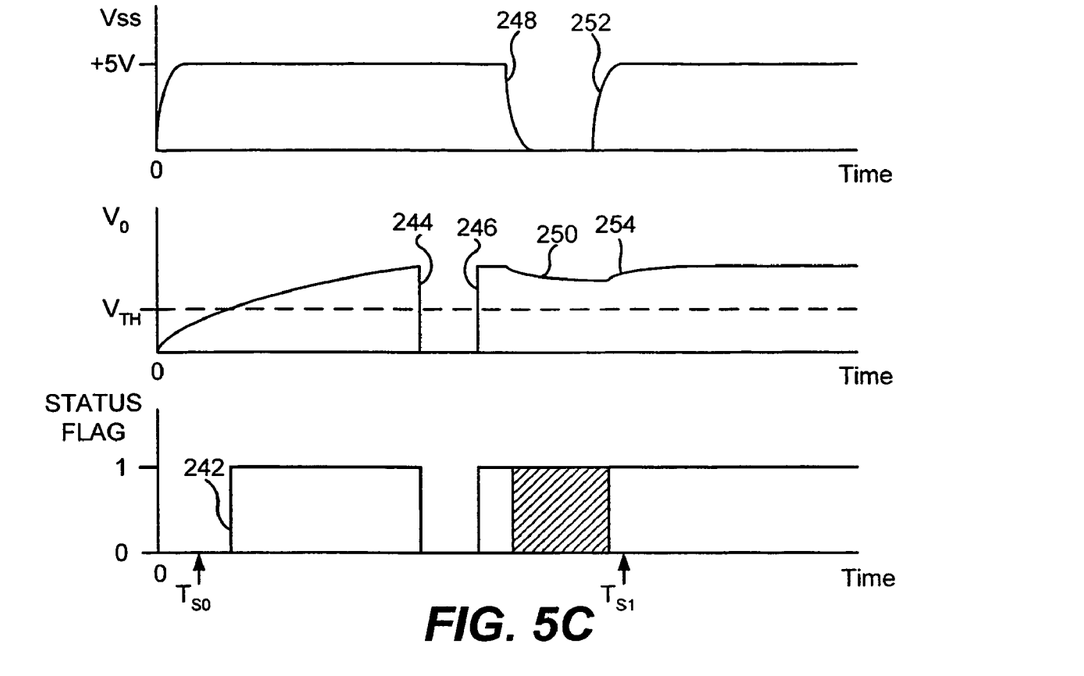

FIG. 5C illustrates a third possible sequence of events. As in FIG. 5A, the sequence illustrated in FIG. 5C begins with the supply voltage $V_{SS}$ off and the STATUS FLAG at logic '0'. The supply voltage $V_{SS}$ is switched on at time zero and increases to the operational voltage level of +5V. After the supply voltage $V_{SS}$ has reached its operational level, the HDA controller 56 checks the level of the STATUS FLAG to determine if a fault condition exists. The initial check of the STATUS FLAG is performed at time $T_{S0}$. At that time, the voltage on the capacitor C1 at node $V_0$ has not yet exceeded the threshold reference voltage $V_{TH}$. Thus, when the STATUS FLAG is checked at time $T_{S0}$, the STATUS FLAG is still at logic '0'. Once the voltage at node $V_0$ exceeds the threshold reference voltage $V_{TH}$, the STATUS FLAG is set to logic '1', as indicated by the rising edge 242 of the STATUS FLAG curve.

The HDA controller may then reset the STATUS FLAG to logic '0' by raising the RESET FLAG input to the flag circuit 100, which forces the voltage at node $V_0$ to zero, as indicated by the falling edge 244 of the voltage at $V_0$. The STATUS FLAG responds by switching to logic '0'. In this case, due to a fault or other system need, the HDA controller 56 subsequently sets the STATUS FLAG to logic '1' by raising the SET FLAG input to the flag circuit 100, which forces the voltage at node $V_0$ to the $V_{SS}$ voltage level, as indicated by the rising edge 246 of the voltage at $V_0$. The STATUS FLAG responds by switching to logic '1'. Thus, the HDA controller 56 may use the STATUS FLAG as a temporary storage flag that may be used to determine that the power has been rapidly recycled the next time the disk drive is powered on.

The supply voltage $V_{SS}$ then cycles off and on, as indicated by the falling edge 248 followed by the rising edge 252 of the supply voltage signal $V_{SS}$. When the supply voltage $V_{SS}$ is turned off, the voltage at node $V_0$ starts to slowly drop, as indicated by the falling edge 250 of the voltage at node $V_0$. When the supply voltage $V_{SS}$ is cycled back on, as indicated by the rising edge 252 of the supply voltage $V_{SS}$, the voltage at node $V_0$ again begins to rise, as indicated by the rising edge 254 of the voltage at node $V_0$. In this case, when the HDA controller 56 checks the state of the STATUS FLAG at time $T_{S1}$, the STATUS FLAG has a value of logic '1', indicating that an unexpected cycling of the supply voltage $V_{SS}$ has occurred. The HDA controller 56 may then execute a diagnostic routine and/or modify the operational characteristics of the drive in an effort to alleviate the conditions that resulted in the power cycling, as discussed above.

Figure 5D:
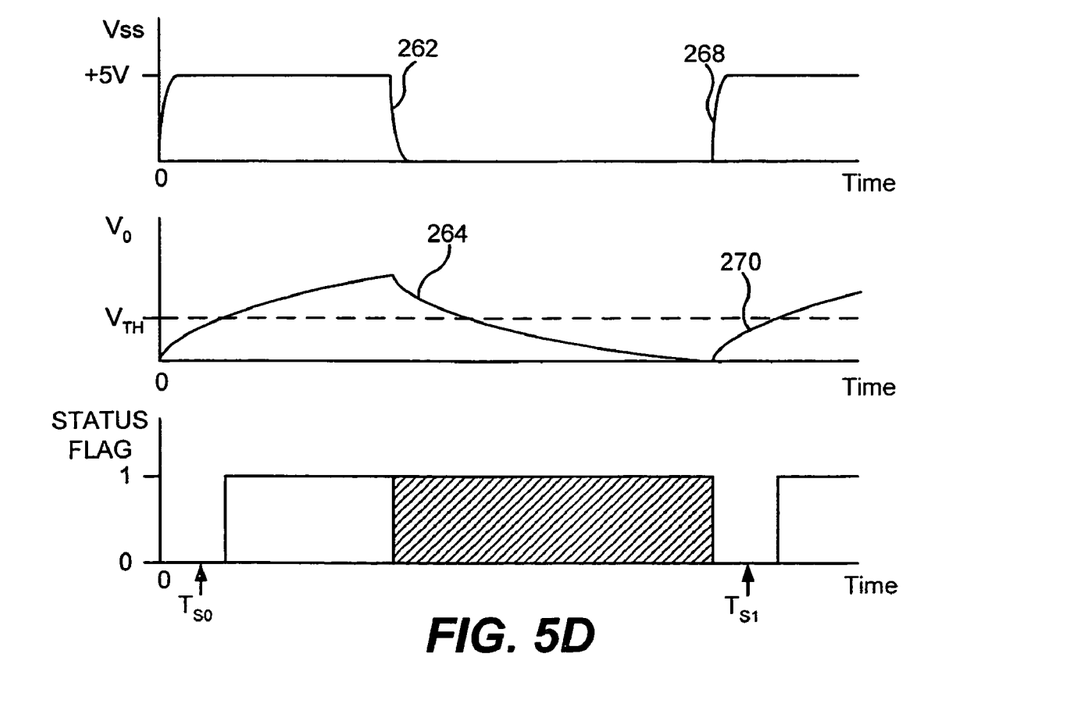

FIG. 5D illustrates a fourth possible sequence of events. In the sequence illustrated in FIG. 5D, the supply voltage $V_{SS}$ is cycled off while the voltage at node $V_0$ exceeds the threshold voltage $V_{Th}$, as indicated by the falling edge 262 of the $V_{SS}$ signal. In response, the voltage at node $V_0$ begins to decrease slowly, as indicated by the falling edge 264 of the voltage at node $V_0$. The supply voltage $V_{SS}$ is subsequently switched back on, as indicated by the rising edge 268. However, in this case, the supply voltage $V_{SS}$ is not switched back on until after the voltage $V_0$ has decreased to below the threshold voltage $V_0$. When the supply voltage $V_{SS}$ is switched back on, the voltage at node $V_0$ begins to slowly rise, as indicated by the rising edge 270. However, when the HDA controller checks the STATUS FLAG at time $T_{S1}$ after the supply voltage $V_{SS}$ has reached its operational level, the voltage at node $V_0$ has not yet exceeded the threshold voltage $V_{TH}$. Thus, the STA- TUS FLAG has a value of logic '0', indicating that a rapid cycling of the power supply has not occurred.

The flag circuit 100 may be provided within the HDA controller 56 and/or may be provided external to the HDA controller 56. Multiple flag circuits 100 can be included in a single disk drive 25. In some embodiments, the flag circuit 100 may be used to provide an input to other circuits within the disk drive 25 besides the HDA controller. In that case, it may be advantageous to buffer the output of the flag circuit 100, which may allow pin sharing.

In addition to disk drives, methods and/or apparatus according to the present invention may be employed in any low-cost electronic devices that are likely to be power-cycled in the event of a failure. In such devices, it may be desirable for the CPU of the device to have knowledge that the power supply has recently been cycled so that a system characteristic can be changed to improve the chance of success upon restart. For example, a different startup procedure could be implemented in the event of an unexpected power cycle.

Embodiments of the invention may be used in any device that includes a disk drive, such as computers, digital video recorders, MP3 players, personal digital assistants, and the like. Furthermore, while embodiments of the invention have been described in connection with disk drives, some embodiments of the invention may be used in any device in which it may be desirable to maintain a status flag through a power recycle (i.e. switching off and back on).

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An electronic device, comprising:
    a flag circuit configured to generate a status flag indicating whether or not a power supply voltage to the electronic device has been cycled within about a defined time; and
    a controller configured to control an operation of the electronic device and to modify an operational characteristic of the electronic device in response to the status flag indicating that the power supply voltage to the electronic device has been cycled within about the defined time.

2. The electronic device of claim 1, wherein the flag circuit comprises a capacitor, wherein the status flag is representative of a voltage on the capacitor, and wherein the defined time is at least partially defined by a capacitance of the capacitor.

3. The electronic device of claim 2, wherein the capacitor is coupled to the power supply voltage through a first resistor, the electronic device further comprising:
    a comparator including an input terminal and an output terminal and configured to compare an input voltage at the input terminal with a reference voltage, wherein the capacitor is further coupled to the input terminal of the comparator.

4. The electronic device of claim 3, wherein the comparator is further configured to output a first logic level if the input voltage at the input terminal exceeds the reference voltage and to output a second logic level if the input voltage at the input terminal is less than the reference voltage.

5. The electronic device of claim 3, further comprising a rectifier between the first resistor and the capacitor, wherein the rectifier is configured to block a flow of current from the capacitor to the first resistor.

6. The electronic device of claim 3, further comprising a bleed resistor in parallel with the capacitor, the bleed resistor having a resistance greater than a resistance of the first resistor, and wherein the defined time is at least partially defined by the resistance of the bleed resistor.

7. The electronic device of claim 3, further comprising a set/reset circuit coupled to the capacitor, wherein the set/reset circuit is configured to set the voltage on the capacitor to the power supply voltage upon receipt of a SET FLAG command, and to reset the voltage on the capacitor to zero upon receipt of a RESET FLAG command.

8. The electronic device of claim 3, further comprising a voltage divider having an output terminal and configured to generate the reference voltage from the power supply voltage, wherein the output terminal of the voltage divider is connected to the comparator.

9. The electronic device of claim 1, wherein the electronic device comprises a disk drive including a data storage disk, and wherein the controller is configured to reduce an angular acceleration of the data storage disk during startup in response to the status flag indicating that the power supply voltage to the electronic device has been cycled.

10. The electronic device of claim 1, wherein the electronic device comprises a disk drive including a data storage disk, and wherein the controller is configured to alter an operational threshold or parameter of the data storage disk in response to the status flag indicating that the power supply voltage to the electronic device has been cycled, wherein the operational threshold or parameter comprises a temperature threshold, a spin start delay, a position error threshold, a modified seek torque, and/or a bit error rate threshold.

11. The electronic device of claim 1, wherein the controller is further configured to return the altered operational characteristic of the electronic device to a previous value after the occurrence of a predetermined condition, wherein the predetermined condition comprises the passage of a predetermined time period following the status flag indicating that the power supply voltage to the electronic device has been cycled and/or the occurrence of a start up without the status flag indicating that the power supply has been cycled.

12. The electronic device of claim 1, wherein the controller is further configured to initiate a fault recovery routine or diagnostic routine in response to the status flag indicating that the power supply voltage to the electronic device has been cycled.

13. A circuit comprising:
    a first resistor;
    a capacitor that is coupled to the power supply voltage through the first resistor; and
    a comparator including an input terminal and an output terminal and configured to compare an input voltage at the input terminal with a reference voltage, wherein the capacitor is further coupled to the input terminal of the comparator;
    wherein the circuit being configured to generate a status flag indicating whether or not a power supply voltage to an electronic device has been cycled, the status flag is representative of a voltage on the capacitor.

14. The circuit of claim 13, wherein the comparator is further configured to output a first logic level if the input voltage at the input terminal exceeds the reference voltage and to output a second logic level if the input voltage at the input terminal is less than the reference voltage.

15. The circuit of claim 13, further comprising a rectifier between the first resistor and the capacitor, wherein the rectifier is configured to block a flow of current from the capacitor to the first resistor.

16. The circuit of claim 13, further comprising a bleed resistor in parallel with the capacitor, the bleed resistor having a resistance greater than a resistance of the first resistor.

17. The circuit of claim 13, further comprising a set/reset circuit coupled to the capacitor, wherein the set/reset circuit is configured to set the voltage on the capacitor to the power supply voltage upon receipt of a SET FLAG command, and to reset the voltage on the capacitor to zero upon receipt of a RESET FLAG command.

18. The circuit of claim 13, further comprising a voltage divider having an output terminal and configured to generate the reference voltage from the power supply voltage, wherein the output terminal of the voltage divider is connected to the comparator.

19. A method of operating an electronic device, comprising:
   generating a status flag indicating whether or not a power supply voltage to the electronic device has been cycled within about a defined time; and
   modifying an operational characteristic of the electronic device in response to the status flag indicating that the power supply voltage to the electronic device has been cycled within about the defined time;
   wherein the operational characteristic of the electronic device includes an operational threshold or parameter of the electronic device.

20. The method of claim 19, wherein generating the status flag comprises comparing a voltage across a capacitor to a reference voltage, the method further comprising charging the capacitor from the power supply voltage using an RC circuit when the power supply voltage is switched on, and discharging the capacitor when the power supply voltage is switched off.

21. The method of claim 20, wherein a charge rate of the capacitor through the RC circuit is faster than a discharge rate of the capacitor.

22. The method of claim 21, wherein discharging the capacitor comprises discharging the capacitor through a bleed resistor having a higher resistance than the resistance of the RC circuit used in charging the capacitor.

* * * * *